Figures 1, 2:
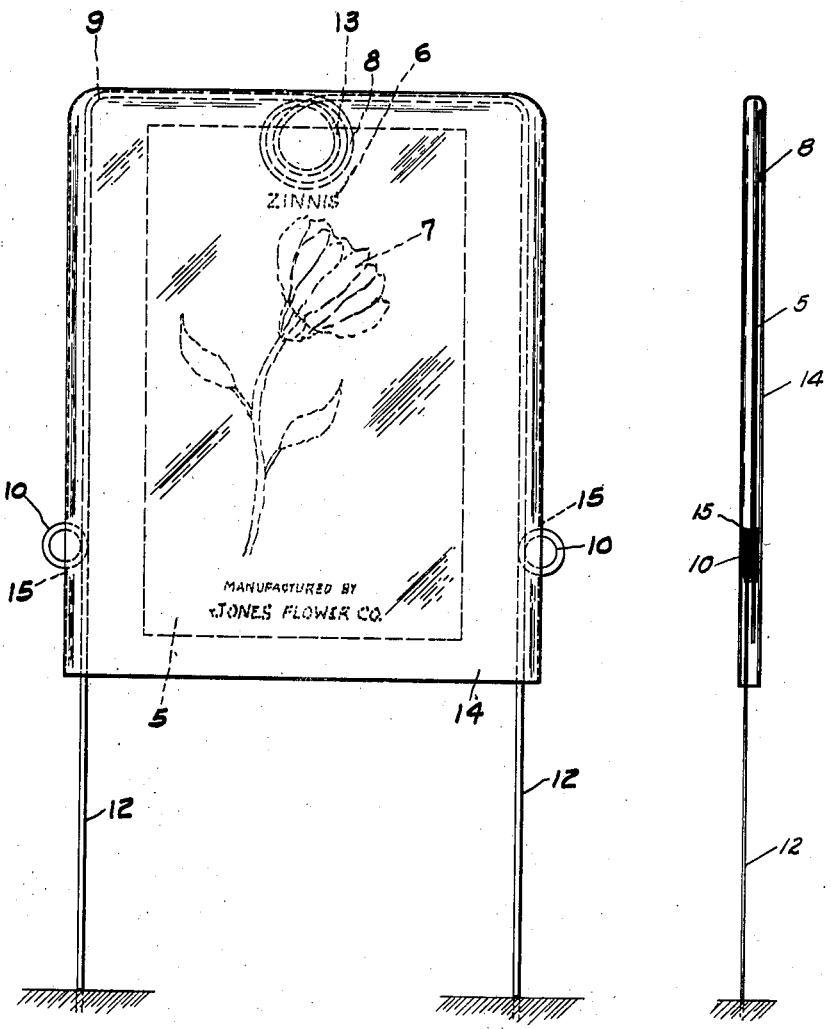

Nov. 2, 1943.    G. ENK    2,333,302
GARDEN MARKER
Filed May 16, 1941

INVENTOR
GRACE ENK
BY Walter E. Schirmer
ATTORNEY

Patented Nov. 2, 1943

2,333,302

UNITED STATES PATENT OFFICE 2,333,302

GARDEN MARKER

Grace Enk, Buchanan, Mich.

Application May 16, 1941, Serial No. 393,755

4 Claims. (Cl. 40—11)

This invention relates to garden markers, and more particularly is directed to a marker adapted for use in connection with the marking of flower beds and seed rows in flower and vegetable gardens and the like.

Garden markers which have been used heretofore and with which I am familiar usually comprise a wooden stick upon which the gardener writes only the name of the particular flower or vegetable being marked. This stick is then inserted into the ground, and of course the marking soon fades due to exposure to weather or rain, or becomes dirty from sprinkling or the like.

Such markers, while inexpensive, therefore do not serve the purpose of providing a more or less permanent marking and convey no information except the name of the particular plant being marked.

The present invention constitutes an improvement over such markers in providing a marker which is absolutely protected from all weather conditions and will remain clear and visible regardless of exposure to sun and rain, and irrespective of any sprinkling or watering action.

In addition, the marker is so constructed as to have two points of support in the ground preventing it from twisting about, and serving to maintain it in a proper facing position so as to be clearly visible at all times.

Another advantage of the present invention is that the present marker shows, in addition to the name of the plant, a picture of the plant, and on the back side, directions for the culture and cultivation thereof.

As a primary feature of the present invention I provide a garden marker which consists of the combination of the seed packet; in which the seeds are packed by the seed distributor, which, in most cases, also contains a colored picture on the face thereof showing the flower or vegetable which will result from the seeds and which, on the back side, contains the correct information as to the planting and cultivation of the seeds to secure the best results; and which I prefer to call a display sheet with a holder for the sheet, which holder is insertable in the ground, and a waterproof cap or cover member enclosing the holder and packet and protecting the same from exposure.

Briefly stating, I provide a wire member of simple and economical form which can be readily bent to form a clip portion at the top into which the display sheet can be inserted, and which then receives a transparent water-proof cover member held in place by projections on the wire support and enclosing both sides of the sheet so that the reading material and illustrations thereon are clearly visible and yet protected from exposure. With this combination, a very simple but complete garden marker can be provided with costs very little to manufacture, can be shipped in flat stacks, and can be sold in quantity at a price such as to be attractive to the gardener, since he already has the display sheet and merely needs to insert it into the clip on the wire support within the transparent cover member.

Other objects and advantages of the present invention will appear more fully from the following detailed description which, taken in conjunction with the accompanying drawing, will disclose to those skilled in the art the particular construction and operation of a preferred form of the present invention.

In the drawing:

Figure 1 is an elevational view of a garden marker embodying the present invention; and Figure 2 is a vertical sectional view therethrough.

Considering now the drawing in detail, there is provided a seed packet 5 which is of the usual form carrying the name of the plant, as indicated at 6, and a colored illustration thereof as indicated at 7, this being in accordance with the usual practice of said producers and distributors. The rear face of the display sheet (not shown) normally contains printed instructions for the planting and cultivation of the seeds.

The sheet 5 is adapted to be inserted into the clip portion 8 of a wire supporting member, indicated generally at 9, and comprising a generally U-shaped structure having the outwardly directed extensions 10 intermediate the ends of the vertical legs 12 thereof. The wire support 9 may be formed of any light gage metal wire, preferably of a flattened or rectangular sectioned wire, and can be provided with the loop projections 10 or with merely outwardly directed reentrant portions corresponding thereto. Intermediate the top frame portion of the member 9, the wire is reversely coiled upon itself to form a pair of loops, indicated at 8 and 13, respectively. Between these loops, which are pressed flat, the upper edge of the sheet 5 is inserted and is frictionally clipped therein, thus holding the sheet in position.

Enclosing both the sheet and the upper portion of the frame 9 is a transparent cover member, indicated generally at 14, which preferably comprises a generally rectangularly shaped body portion opened at its lower edge and capable of being slipped downwardly over the frame member 9 enclosing the frame member and the opposite sides of the sheet 5. In its vertical edges adjacent the lower ends thereof, the cover member 14 is provided with openings 15 through which the projections 10 may extend. In assembling the cover member in place, the leg portions of the frame are pressed slightly toward each other to move the projections 10 inwardly sufficiently to allow the cover member 14 to be slid therepast, and when the cover member is in position, release of the legs 12 allows the projections 10 to extend outwardly through the openings 15. This serves as a lock to prevent any vertical shifting of the cover member 14, the cover member being thus held against displacement by the interlock between the projections 10 and the defining edges of the openings 15.

It will thus be seen that regardless of the action of rain or the like, the display sheet is fully protected from exposure, and will retain its legibility and appearance throughout the length of the gardening season. The cover member 14 is preferably made of a transparent material such as "Cellophane," or a similar cellulose product which is both transparent and resistant to the weather. At the end of the gardening season, the cover member 14 may be washed and dried and, together with the frame member 9, placed away for use the following year, it being apparent that any desired type of seed packet can be inserted therein at any time.

From the foregoing description, it will be obvious that the present type of garden marker is capable of simple and very economical production, and can be used over and over again. It has distinct characteristics of utility, economy and serviceability, and permits the gardener to make full use of the information and illustration appearing on the display sheet, which is impossible in connection with previous types of markers upon which the gardener had to write such information and which were subject to the deteriorating influence of sun, wind and rain.

The legs 12 of the frame may be made as long as desired in order to secure adequate support of the marker in the ground, and if desired, might be bent slightly above the portion inserted in the ground so as to place the cover and display sheet at an angle such as to render the same clearly visible from above. This, however, is merely a convenience, and of course does not affect the cooperation of the parts in any manner.

I am aware that slight changes may be made in certain details of the clip and interlock between the cover and support, and therefore do not intend to be limited to the exact details of the structure which has been herein shown and described as one embodiment of the present invention. I therefore intend the invention to be limited only as defined by the scope and spirit of the appended claims.

I claim:

1. A garden marker comprising a sheet-like member carrying illustrative matter upon opposite sides thereof, a frame member including laterally spaced vertically extending legs provided with outwardly directed projections intermediate the ends thereof and provided with a transverse portion at the top thereof having an intermediate friction clip adapted to receive the upper edge of the sheet-like member, and a transparent weather-proof cover member engageable over the frame and having means in the side edges thereof adapted to be interlocked with said projections for maintaining the cover member in position over the upper transverse portion of the frame and sheet-like member.

2. In combination, in a garden marker, an inverted U-shaped frame member having laterally spaced depending leg portions adapted to be inserted in the ground and having means forming lateral projections in that portion of the leg portions disposed above the ground, means forming a friction clip in said frame member adjacent the top thereof, an indicator member adapted to have its upper edge secured in said clip and of a length such as to depend slightly below said projections between said leg portions, and a rectangularly-shaped transparent weather-proof closure member open at its lower edge and insertable over said frame member and completely enclosing the upper portion of said frame member and said indicator member, said cover member having openings in the side edges thereof through which said lateral projections are adapted to extend to interlock the cover member with the frame for maintaining the same against displacement.

3. A garden marker comprising a spring wire frame member having a transverse top portion provided with an integrally formed friction clip and having depending laterally spaced leg portions adapted to be inserted at their lower ends into the ground to support the frame member in a vertical position, said leg portions having outwardly directed projections intermediate the ends thereof, an indicator sheet adapted to be frictionally secured at its upper edge in said clip between said leg portions and lying in the plane thereof, and a transparent weather-proof cover member engageable over the top of said frame and movable downwardly thereon to enclose both sides of said sheet, said cover member having openings formed in the lateral edges thereof adapted to receive said projections for interlocking the cover member against displacement from said frame member.

4. In a garden marker, an inverted U-shaped frame member adapted to have the ends of the legs thereof inserted into the ground for support, an indicia bearing member, means in the upper end of said frame member for securing said indicia bearing member in depending position between said leg portions, a transparent cover member open at the lower edge and insertable over said frame member to enclose said indicia bearing member and the upper portion of said frame member, and interlocking means between said cover member and said legs for maintaining the cover member against displacement.

GRACE ENK.